(No Model.)　　　　　　　　　　　　　　2 Sheets—Sheet 1.
F. LANSBERG.
BRAKE FOR LOCOMOTIVES.
No. 406,844.　　　　　　　　　Patented July 9, 1889.
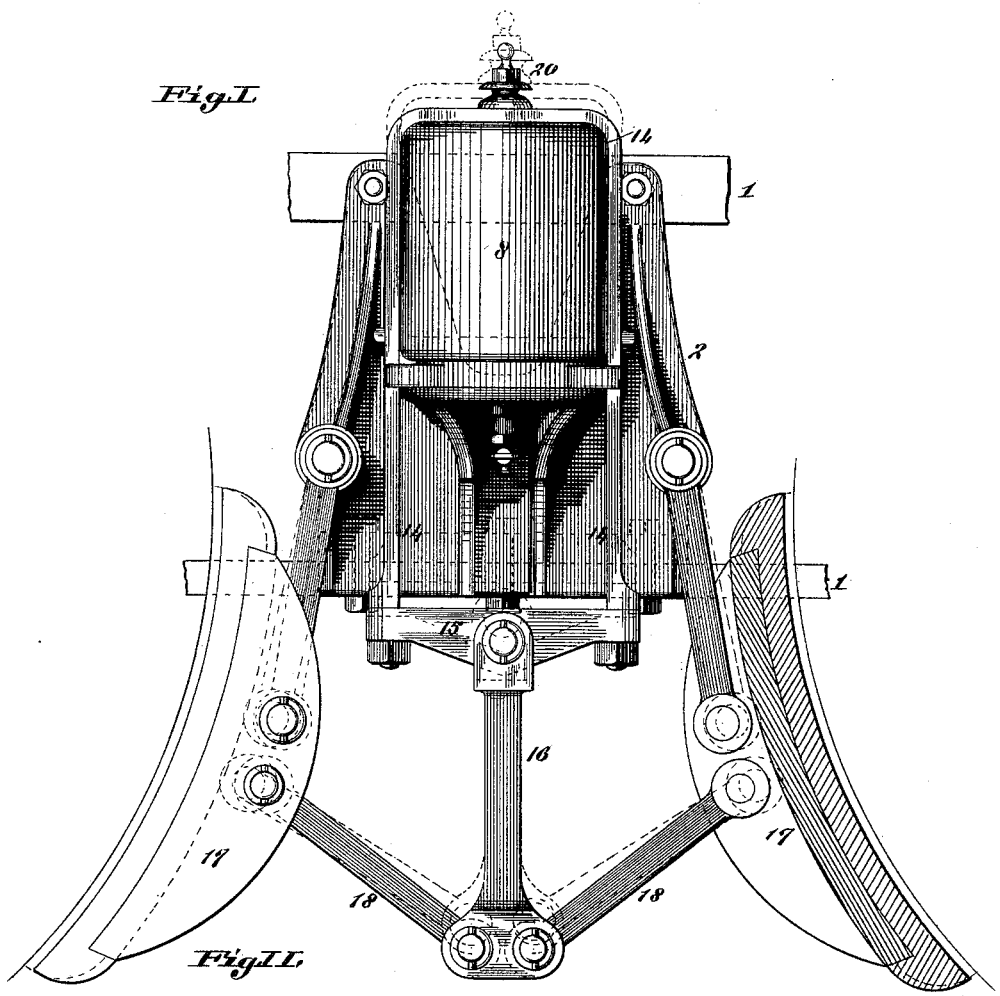
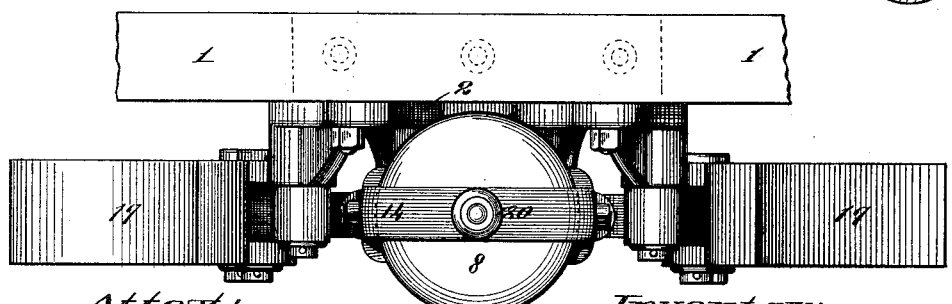

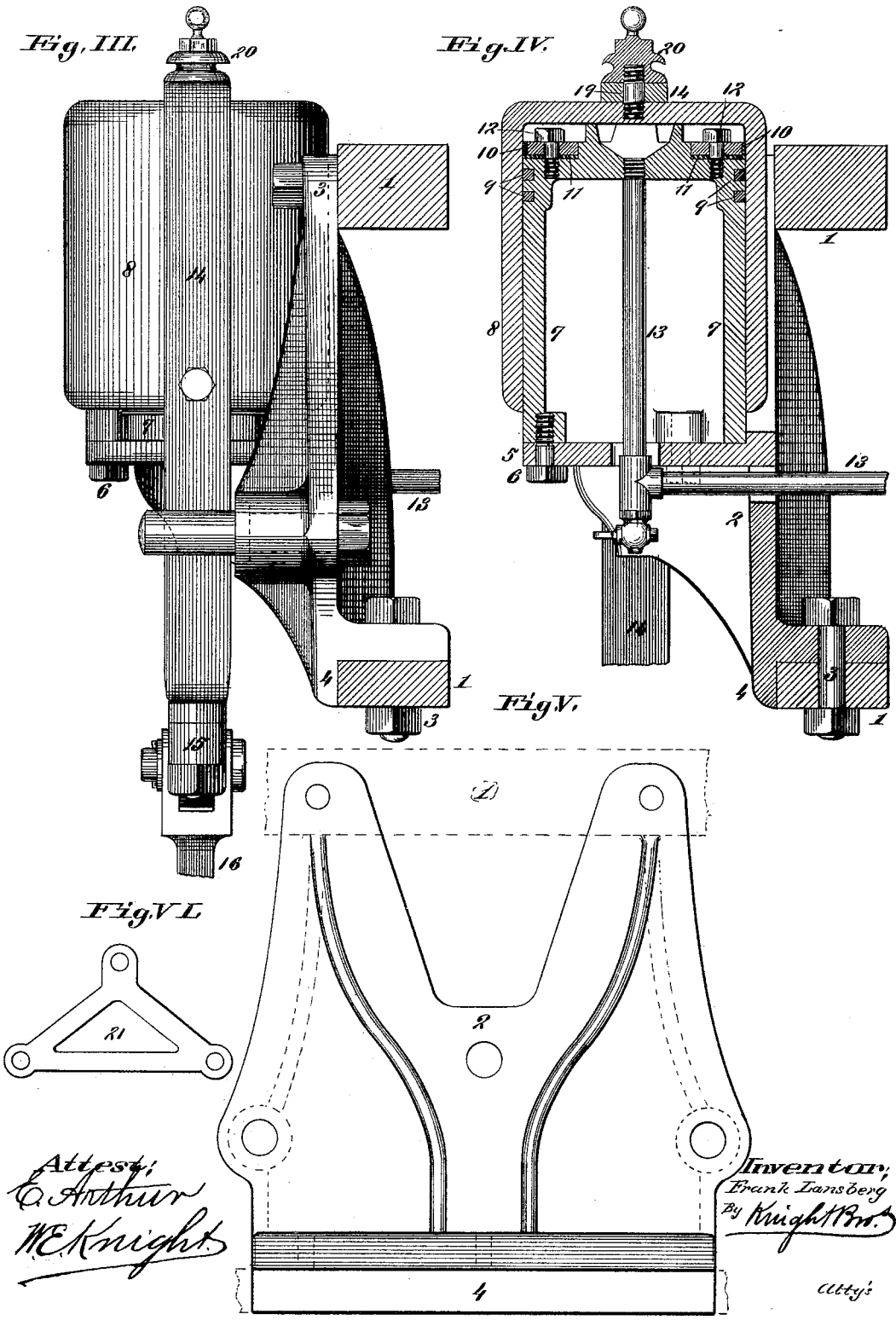

UNITED STATES PATENT OFFICE.

FRANK LANSBERG, OF ST. LOUIS, MISSOURI, ASSIGNOR TO THE LANSBERG BRAKE COMPANY, OF EAST ST. LOUIS, ILLINOIS.

BRAKE FOR LOCOMOTIVES.

SPECIFICATION forming part of Letters Patent No. 406,844, dated July 9, 1889.

Application filed March 19, 1889. Serial No. 303,843. (No model.)

*To all whom it may concern:*

Be it known that I, FRANK LANSBERG, of the city of St. Louis, in the State of Missouri, have invented a certain new and useful Improvement in Brakes for Locomotives, &c., of which the following is a full, clear, and exact description, reference being had to the accompanying drawings, forming part of this specification, in which—

Figure I is an elevation showing one of the shoes in section and illustrative of my invention. Fig. II is a top view. Fig. III is a side view. Fig. IV is a vertical section. Fig. V is a view of the supporting-bracket, and Fig. VI illustrates a triangle for use on certain constructions of locomotives.

My invention relates to improvements in brakes more particularly intended for use on locomotives, but which might be used for other purposes; and my invention consists in features of novelty hereinafter fully described, and pointed out in the claims.

Referring to the drawings, 1 represents part of the frame-work of a locomotive.

2 represents a bracket secured to the frame 1 by any suitable means. I have shown it bolted to the frame at 3 and provided with a lip or flange 4, fitting against the lower part of the frame to assist in preventing lateral movement. This bracket is provided with a lip or flange 5, to which is bolted or screwed, as shown at 6, a stationary piston 7, over which fits a movable cylinder 8.

9 represents packing-rings between the piston and cylinder, and 10 an additional packing-ring between the piston and cylinder, which is made in the form of a cup-leather, and which is held to the piston by means of a ring 11 and screws 12.

13 represents a steam or air pipe discharging into the chamber between the piston and cylinder, for giving movement to the latter. I have shown this pipe passing up through the piston, (see Fig. IV;) but it may communicate with the chamber by any manner of connection.

14 represents a strap or yoke passing over the cylinder and connected at its lower ends to a cross-head 15. To the head 15 is secured the upper end of a link 16. To the lower end of this link 16 the brake-shoes 17 are connected by means of links 18. The shoes are suspended from the bracket 2 by means of links 28.

I have shown the strap 14 secured to the cylinder by means of a screw-pin 19, on the upper end of which a cap 20 is fitted.

The operation of the device is as follows: The air or steam being turned on in the pipe 13, the cylinder 8 is raised or lifted from the position shown in Fig. IV. As the cylinder is thus raised, it pulls upward on the link 16 and moves the inner ends of the links 18 from the position shown in full lines, Fig. I, toward the position shown in dotted lines. This forces the brake-shoes outward against the wheels of the locomotive and produces the brake. Then, as the steam or air is closed off from the pipe 13 and allowed to exhaust, the cylinder falls again, and the brakes are thus released. By thus arranging a stationary piston and a movable cylinder, and by connecting the brake-shoes to the cylinder by means of the strap or yoke and the cross-head and links, a very substantial and cheap device is produced.

In some locomotives the wheels upon which the brakes work are farther apart than in others.

The construction of the link 16 that I have described may be used on locomotives where the wheels are close together, and where they are farther apart a triangle like that shown at 21 in Fig. VI may be employed. This would throw the links 18 farther apart.

I claim as my invention—

1. In a brake for locomotives, &c., the combination of a fixed piston, a movable cylinder, and connection between the cylinder and brake-shoes, substantially as and for the purpose set forth.

2. In a brake for locomotives, &c., the combination of a fixed piston, a movable cylinder, brake-shoes, and connection between the brake-shoes and cylinder, consisting of a strap or yoke and links, substantially as and for the purpose set forth.

3. In a brake for locomotives, &c., the combination of a fixed piston, a movable cylinder, brake-shoes, a strap or yoke connected to the cylinder, the cross-head secured to the lower ends of the strap, a link secured to the cross-head, and links connecting the shoes to the link of the cross-head, substantially as and for the purpose set forth.

4. In a brake for locomotives, &c., the combination of a bracket 2, secured to the frame of the locomotive and having a flange or table 5, the piston secured to the flange, an air or steam pipe extending up through the piston, a movable cylinder fitting over the piston, a strap or yoke secured to the cylinder by means of a pin 19 and a cap 20, a cross-head secured to the lower end of the strap, brake-shoes, and links connecting the shoes to the cross-heads, substantially as and for the purpose set forth.

FRANK LANSBERG.

In presence of—
GEO. H. KNIGHT,
G. W. PFEIFFER.